Figure 1:
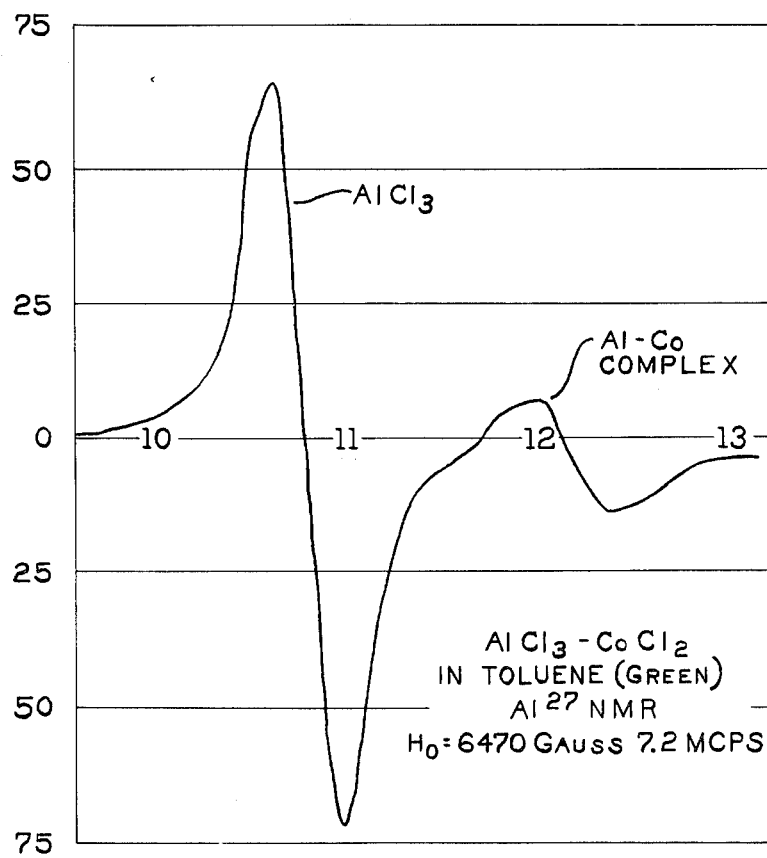

United States Patent Office 3,236,826
Patented Feb. 22, 1966

3,236,826
CATALYST SOLUTION AND PROCESS OF
POLYMERIZING THEREWITH
Harvey Scott, Akron, Ohio, and Donald E. O'Reilly,
Hinsdale, Ill., assignors to Goodrich-Gulf Chemicals,
Inc., Cleveland, Ohio, a corporation of Delaware
Filed Jan. 13, 1961, Ser. No. 82,489
14 Claims. (Cl. 260—94.3)

The present invention relates generally to a novel catalyst and process utilizing same for the directed polymerization of butadiene-1,3 hydrocarbons. More specifically, the present invention relates to a method for the directed polymerization of butadiene-1,3 and isoprene to produce essentially all cis-1,4 homopolymers.

In recent years, there have been developed "Ziegler" style catalysts capable of polymerizing a wide variety of alpha-monoolefinically unsaturated hydrocarbons such as ethylene and propylene to form highly valuable polymers of greatly increased linearity and crystallinity. Variations of this type of catalyst have been shown to have a high directive activity in the polymerization of 1,3-diene hydrocarbons to produce all-1,4 homopolymers and copolymers. Also, alkyl lithium compounds have been demonstrated to have appreciable directive catalytic activity with isoprene so as to produce homopolymers containing 85–88% of the cis-1,4 structure.

All of these catalysts have required at least one ingredient which is an organometallic compound in which at least one hydrocarbon group is attached through a carbon atom to an atom of aluminum, alkali metal, zinc, magnesium, tin, lead or the like. Such catalyst ingredients are expensive to make and are extremely sensitive and dangerous to handle because of their often pyrophoric character in air. It would be highly advantageous if a process could be provided which utilizes directive catalytic effect yet which do not require a dangerous, expensive organometallic ingredient in their preparation.

These and other objectives are achieved, in accordance with the present invention, by providing three-component catalyst solutions containing a coordination compound in which one atom of a divalent transition metal, as defined below, is coordinated with two atoms of aluminum through bridges of halogen atoms having an atomic weight greater than 19 (i.e. chlorine, bromine and iodine) and the resulting coordination compound is reacted with, associated with, or otherwise combined in solution with at least 0.5 mole, more preferably 1 to 4 or more moles, of a material selected from the class consisting of thiophene, vinyl thiophene, aromatic hydrocarbons, and alkyl amines, per mole of aluminum in the solution. Such three-component catalyst solutions are unique cis-1,4 directive catalysts for the polymerization of butadiene-1,3 producing therefrom commercially valuable rubbery polymers in which at least 90% of the butadiene-1,3 hydrocarbon monomer units are joined 1,4 and strongly predominating (i.e. at least 50%) in cis-1,4 with a low percentage of 1,2 structural units.

Such catalysts are utilized in a process wherein a monomeric butadiene-1,3 hydrocarbon is mixed with a reaction medium which is stable against spontaneous combustion in air and containing the three-component catalyst solution, and carrying out the polymerization of the monomer therein at a temperature below about 75° C., preferably between about −30° and 60° C., under an inert atmosphere. Handling of such a reaction medium involves no more risk than is normally associated with the handling of the solvents, diluents, and monomer employed for the catalyst contains no hydrocarbon groups bound to metal atoms by normal valence bonding (i.e. by direct carbon-metal bonds). With butadiene-1,3 the process produces at good reaction rates linear, crystalline homopolymers having a structure in which more than 95% of the butadiene units are joined 1,4 and more than 90% of the 1,4 bonds are cis-1,4. When carried out under the preferred conditions with the preferred cobalt:aluminum catalysts, the process produces polybutadienes high in molecular weight and having a structure in which 90 to 99% or more of the butadiene units are joined cis-1,4. With isoprene, rubbery homopolymers are produced having a structure in which up to 90% or more of the isoprene units are joined 1,4. Commercially valuable rubbery polyisoprenes having a structure in which up to 85% or more of the isoprene units are joined cis-1,4 with little trans-1,4 and amounts of 3,4 structure slightly greater than is found in natural rubber. These results are obtained without a hydrocarbon-metal catalyst ingredient.

CATALYST PREPARATION

It has been found that divalent transition metals whose divalent ion, existing in a state of maximum multiplicity in a weak ligand field (such as that produced by $AlCl_4$), contains but one electron in any of its two highest energy penultimate $d$ orbitals, form complexes with aluminum halides containing halogens having an atomic weight greater than 19. Stated another way, when the ion of divalent form of a transition metal of this class is coordinated with ligands such as halogen atoms, its $d$ orbital electrons are subjected to electrostatic fields resulting in splitting of the $d$ orbital electrons whereby the latter arrange themselves in high and low energy levels with but one electron in any of the two highest energy penultimate $d$ orbitals. Thus, divalent transition metals whose ions contain no $d$ orbital electrons, or which have a more or less complete shell (9 or 10 in number) of $d$ orbital electrons do not form catalysts having cis-1,4 directive effect in the polymerization of butadiene-1,3 hydrocarbons.

Divalent transition metals which fall within the above definition are cobalt (preferred) nickel, iron, manganese, chromium, palladium and platinum.

The three-component cis-1,4 directive catalyst solution can be synthesized directly in one step by reacting the three essential ingredients or it can be prepared by a two-step procedure wherein there is first prepared a two-component (transition metal: aluminum) coordination compound and then combining the latter in solution with the third catalyst-forming ingredient. The one-step precedure carried out in an alkylated aromatic hydrocarbon such as xylene leads to a three-component "oil" (analogous to the coacervate formed between an aluminum trihalide and an aromatic hydrocarbon) containing combined transition metal and aluminum and which is insoluble in most hydrocarbon media. In hydrocarbon media containing a monomeric butadiene-1,3 hydrocarbon the "oil" is usually soluble. When the one-step procedure is carried out in a non-alkylated aromatic hydrocarbon such as benzene, a solution results. When an auxiliary proton-acceptor such as metallic aluminum or magnesium is present, or on long reaction, an "oil" is formed in benzene which also may be solubilized upon addition of monomer and/or an amine, as described herein.

In any of the procedures described herein, formation of either the two-component coordination compound or the three-component catalyst solution requires that the ingredients be brought together in a manner permitting reaction on a molecular scale. Thus, one can combine the metal compounds and heat the mixture so as to permit, or cause, mutual solubility or absorption of one in the other, or in a mutual solvent. The anhydrous metal compounds can be mixed and heated to effect melting or fusion in the solid state; they may be mixed in a diluent or solvent medium having at least a small solvent action for one of the ingredients; or the more volatile of the two metal compounds (usually the aluminum halide) can be vaporized and its vapors brought into contact with the other metallic ingredient at a temperature above the condensation point of the vapors until absorption (chemisorption) occurs as evidenced by gain in weight of the solid. Any of the resulting solid forms of the coordination compound may be heated to sublime the two-component coordination compound and obtain it in a relatively pure crystalline form free of uncoordinated catalyst ingredients.

Solution techniques involve dispersing the transition metal or compound thereof and the aluminum halide in a liquid aromatic hydrocarbon, or in a dry hydrocarbon medium containing at least 5% by weight of an aromatic hydrocarbon, and heating the resulting mixture. The ingredients pass into solution. If one persists in heating the mixture a dark-colored oily-appearing material is noted gradually to settle out at the bottom of the mixture. The latter is a three-component catalyst of this invention in which the transition metal compound and the aluminum halide are found to have united in a 1:2 (respectively) molar ratio. The aromatic hydrocarbon is associated or "coacervated" (in the "oil" forms of the catalyst) with the coordination compound for the aromatic hydrocarbon can be distilled from the "oil," but with difficulty.

The divalent transition metal may be utilized, in any of these or other procedures, in the form of the metal itself, preferably in finely-divided form, and in the form of any of its compounds such as its salts of inorganic and organic acids, its oxides, hydroxides, and complexes and many others. For example, cobalt/aluminum catalysts of this invention can be prepared from finely-divided cobalt metal for the latter passes into solution in the aluminum halide or into a solution of an aluminum halide in a hydrocarbon solvent. Likewise, there may be utilized anhydrous cobaltous halides such as cobaltous fluoride, cobaltous chloride, cobaltous bromide, cobaltous iodide, cobaltous chlorobromide, cobaltous chlorofluoride, and others; cobaltous sulfate, cobaltous nitrate, cobaltous orthophosphate, cobalt orthotitanate, and salts of other inorganic acids; cobalt hydroxide; cobaltous acetate, cobaltous octoate (a commercial paint and varnish "drier"), cobaltous palmitate, cobaltous stearate, cobaltous tartrate, cobaltous benzoate, cobaltous phthalate, cobaltous naphthenate (another "drier"), cobaltous maleate, and salts of other organic acids, cobalamine complexes such as cobalt/pyridine complexes, cobalt acetyl-acetonate, and many others. The cobaltous halides are much preferred.

Complex formation is facilitated and very active complexes are prepared from divalent transition metal compounds which are salts or complexes of an acid having, per se, a dissociation constant (for the first hydrogen) greater than about $4 \times 10^{-2}$ when measured at 18 to 25° C. This preferred class of transition metal compounds include the salts of most strong inorganic acids and of the more highly dissociated organic acids. Thus, in addition to the salts of the hydrohalogen acids, there may be utilized the divalent transition metal salts of nitric acid, sulfuric acid, of the perhalogenated carboxylic acids such as perfluoro-butyric acid (hepta-fluoro butyric acid), perfluorooctanoic acid (pentadeca-fluorooctanoic acid), and many others, and of the hydrocarbon sulfonic acids, hydrocarbon halosulfonic acids, and many others.

Likewise, finely-divided metallic nickel can be utilized in the preparation of these catalysts and also the divalent(ous) nickel salts corresponding to those above, and particularly nickelous chloride, nickelous bromide, nickelous iodide, as well as nickelous fluosilicate, nickelous hydroxide, nickelous benzene sulfonate, nickelous acetate, nickelous stearate, nickelous salts of the perfluoro carboxylic acids, and many others.

Chromium is similar and can be utilized in a similar fashion. Chromous halides such as chromous chloride, chromous bromide, and chromous iodide are preferred.

Manganese is similar and there may be utilized any compounds corresponding to any of the above and other compounds including manganous chloride, manganous bromide, manganous iodide, manganous hydroxide, manganous sulfate, manganous nitrate, manganous fluosilicate, manganous acetate, manganous valerate, manganous tartrate, and many others. Manganous halides are preferred.

Iron likewise may be utilized in similar compounds and particularly as ferrous chloride, ferrous bromide, ferrous iodide, ferrous sulfate, ferrous hydroxide, ferrous ferrocyanide, ferrous tartrate, and many others. Ferrous halides are preferred.

Platinum metal has such a high melting point and low solubility (also expensive) that it is difficult to utilize. However, catalyst formation is facilitated by utilizing platinum(ous) chloride, platinum(ous) bromide, platinum(ous) sulfate and others. Platinous halides are preferred.

It is to be understood that the divalent transition metal compound must be in anhydrous form before being utilized in catalyst preparation. Many of the salts of these metals are most readily available in hydrated forms which are easily dehydrated before use. Heating the hydrated salt in a vacuum oven at temperatures of 75° C. to 500° C. will usually result in dehydration. Another convenient method is to suspend the finely-divided transition metal compound in an aromatic hydrocarbon which forms an azeotrope with water and then distill off the azeotrope until dehydration has occurred. The resulting slurry of dehydrated salt need be protected only by an inert atmosphere until employed in catalyst manufacture.

The aluminum halide ingredient can be any anhydrous inorganic aluminum halide compound having Friedel-Crafts activity (i.e. activity in Friedel-Crafts reactions and/or the ability to induce a polymerization of butadiene-1,3 hydrocarbon forming polymers of heterogenous structure, usually resinous in form as distinguished from rubbery polymers) and in which the halogen has an atomic weight greater than 19. Mixtures of such halides can also be employed. Thus, there may be utilized aluminum trichloride, aluminum tribromide, aluminum triiodide, and any of the mixed trihalides of aluminum. Aluminum trifluoride is so sparingly soluble and so high in melting point (1040° C.), it is difficult to prepare catalysts therefrom. Also, no evidence has been found that fluorine will enter into coordination compounds. However, the aluminum halide can contain one or two fluorine atoms per aluminum and coordination compounds can be formed providing a sufficient excess of the mixed aluminum fluorohalide or a transition metal halide is utilized to provide the coordinating halogens through halogen exchange. Because aluminum triiodide is a difficult-to-obtain and expensive material of questionable stability, the preferred inorganic aluminum halide is one in which the halogen has an atomic weight in the range of 35 to 80 (i.e. chlorine and bromine).

The ratio in which the divalent transition metal compound and the aluminum halide are combined is not critical since the two apparently combine only in the 1:2 ratio (respectively). Any excess of either ingredient is present in uncoordinated form and the mixture can be separated by subliming the more volatile coordination compound away from the residue or by dissolving the coordination compound out of the matrix. However, best results are obtained when the aluminum halide is twice the transition metal compound, on a molar basis.

In all of the above methods of making these catalysts, there is ample evidence of the formation of a coordination compound. The following description will utilize cobalt as the illustrative divalent transition metal although it is to be understood that the coordination compounds of the other divalent transition metals described above behave similarly.

For example, when the characteristically blue-colored (anhydrous) $CoCl_2$ is exposed to the sublimed vapors of $AlBr_3$, the color changes to a light green. Likewise, fusion of solid $AlBr_3$ and $CoCl_2$ produces the same color change. Similarly, a fused mixture of anhydrous $CoCl_2$ and anhydrous $AlCl_3$ is a blue-colored solid which upon solution in benzene forms a green-colored solution. The blue-colored fusion melt of 1 mole $CoCl_2$ and 2 moles of $AlCl_3$ sublimes at temperatures 400–500° C. lower than the blue-colored anhydrous $CoCl_2$ and condenses out forming blue-colored needle-like crystals analyzing as containing 1 atom of cobalt for every 2 atoms of aluminum. The sublimed crystals form very active catalysts.

Studies of the fused and chemisorbed solids, the "oils," and the solutions referred-to above, have further confirmed complex formation in 1:2 cobalt:aluminum ratio. For example, cobalt:aluminum complexes exhibit a characteristic electron paramagnetic resonance (EPR) signal not shown by most forms of uncomplexed cobalt. The observed EPR signal is due to crystal field splitting, as indicated above. Analysis of the EPR spectra obtained from solid catalysts frozen at −196° C. indicated that the crystal field about the cobalt nucleus has more nearly octahedral symmetry. In solution, the three-component catalyst shows a more nearly square planar symmetry about cobalt. It appears that the crystal field about aluminum exhibits tetrahedral symmetry. It is to be understood that in many cases the symmetry of the crystal field about cobalt and aluminum can be distorted.

Tabulated below are measured and calculated EPR data including the measured g-factor parallel ($g^{11}$) and the measured g-factor perpendicular ($g^1$) to the axis of symmetry about cobalt in (1) a solid two-component coordination compound and (2) in a three-component catalyst solution. The column labelled (Δ) is a measure of the distortion of the pure octahedral crystal field (Δ=0 representing pure octahedral).

form. Since each of the unassociated catalyst ingredients is incapable of directive polymerization, it is believed that the 2:1 coordination compound is a part of the active species, the latter being a 3-component material in solution, as indicated above.

The 1:2 cobalt dichloride:aluminum trichloride (two-component) coordination compound in solution exhibits Nuclear Magnetic Resonance (NMR) signals in which the resonance of $Al^{27}$ is shifted by 316 p.p.m. to higher field (see FIG. 1), a shift quite unlike all $Al^{27}$ resonance shifts previously known in that such shift occurs with a chemical shift of +216 p.p.m. relative to $Al(H_2O)_6^{+3}$. The observed high field $Al^{27}$ resonance is explainable on the basis of coordinated largely square planar cobalt in solution. In the solid state, this same high field resonance is obscured by the lack of resolution with respect to $Al^{27}$. Known compounds of aluminum exhibit negative values of shift relative to $Al(H_2O)_6^{+3}$.

When the 1:2 cobalt chloride:aluminum trichloride coordination compound is dissolved in benzene and the resulting solution titrated with butadiene-1,3 vapor, the aforementioned high field $Al^{27}$ resonance "peak" gradually disappears whereas the lower field resonance attributed to "free" or uncoordinated $AlCl_3$ is substantially undiminished. These latter observations are taken as an indication of (1) formation of a coordination compound, (2) that the coordination compound is part of the active catalytic species, and (3) that polymerization proceeds on sites associated with the aluminum rather than with the divalent transition metal portion of the catalyst.

Further, one finds that the polymers produced by a 3-component catalyst made with thiophene contain combined sulfur. Sulfur analysis indicates that an average of about one thiophene group is attached to each polymer chain. For example, a cis-1,4 polybutadiene made in such a fashion having an inherent viscosity of 2.16 (mol. wt. 90,500) has a sulfur content of 0.038%, 0.044% which agrees within experimental error with the corresponding

| Catalyst | Solvent | Intensity EPR signal | g-factor | | Δ | Symmetry |
|---|---|---|---|---|---|---|
| | | | $g^1$ | $g^{11}$ | | |
| (1) $AlCl_3$ vapors absorbed on solid $CoCl_2$. | None | Strong | 4.6 | ~4 | −4 | Octahedral. |
| (2) Same | Benzene | Medium | 4 | ~4 | −4 | Do. |

Figure 2:
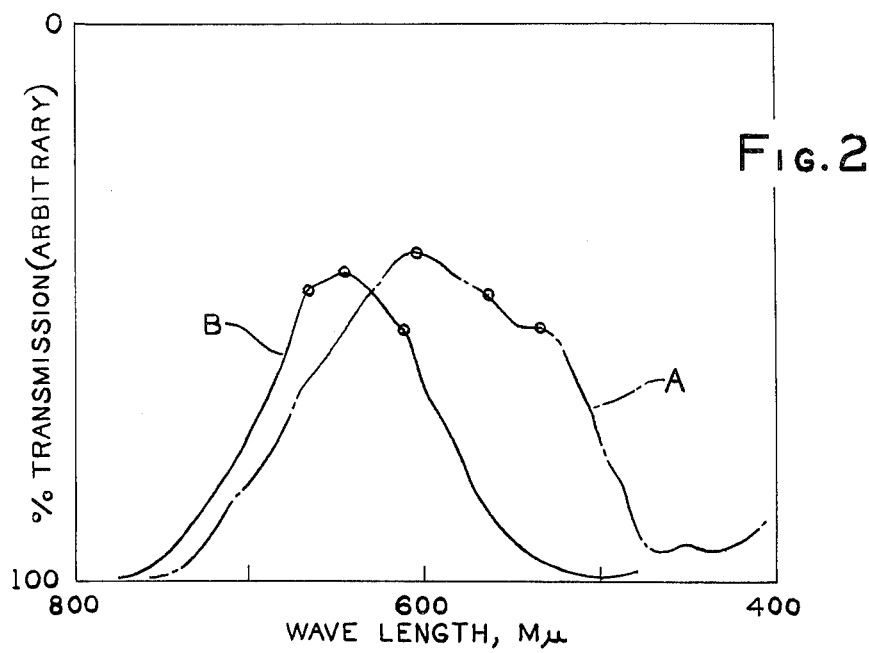

The three-component catalyst solutions, and the fused and chemisorbed solid forms of the two-component coordination compounds used in this invention, exhibit optical spectra characteristic of 4- and 6- coordinated complexes. FIG. 2 of the drawings is a graphical representation of such optical spectra. Curve "A" represents the optical spectra of a blue-colored, highly-active solid catalyst of this invention prepared by fusing about one mole of anhydrous $CoCl_2$ with two to three moles of anhydrous $AlCl_3$. Curved "B" represents the spectra of a green-colored solution prepared by extracting the blue solid of curve "A" with benzene. Both curves of FIG. 2 show three inflections (indicated by the encircled dots) in the visible region, a type of spectra known to be characteristic of complexes having more or less cubic symmetry, curve "A" being characteristic of a complex having more nearly octahedral symmetry and curve "B" being characteristic of a complex more nearly square planar.

Similarly, X-ray spectra of fused and chemisorbed solid forms of the catalysts of this invention show that the interaction of the cobalt and aluminum halide ingredients results in the formation of a complex in which 2 moles of the aluminum ingredient and 1 mole of the cobalt ingredient are associated. The similarity of these spectra to the spectra of known complexes clearly indicates that only the 2:1 Al/Co complex is formed, any excess of either ingredient being present in unassociated calculated value (0.035%). The resulting polymer is quite resistant to gelation.

The two-component coordination compounds described above have catalytic activity in the polymerization of butadiene-1,3 hydrocarbons. However, they seem to function by two competing mechanisms. One mechanism is the desirable cis-1,4 directed reaction and the other is a Friedel-Crafts heterogenous type of polymerization. In addition, the two-component coordination compound has the power to "alkylate" the polymer. In aromatic solvents, the polymer will show "phenylation." As a result, the two-component coordination compound produces, per se, polymers low in unsaturation and in which not more than about 50% of the available unsaturation is present in the desirable cis-1,4 structure. When, however, the third essential catalyst ingredient or complexing agent is added, the cis-1,4 content of the polymer sharply rises and alkylation and/or arylation is reduced indicating suppression of the Friedel-Crafts activity of the catalyst. In copending application, S.N. 6,444, filed February 3, 1960 now abandoned, of which this application is a continuation-in-part, the Friedel-Crafts activity sometimes observed was attributed to "free" or uncoordinated aluminum halide. In the copending application, it was also indicated that addition of thiophene suppressed Friedel-Crafts activity by reacting with such free aluminum halide. As will appear below, however, thiophene appears to react preferentially with the two-component coordination compound.

THREE-COMPONENT CATALYST

Figure 3:
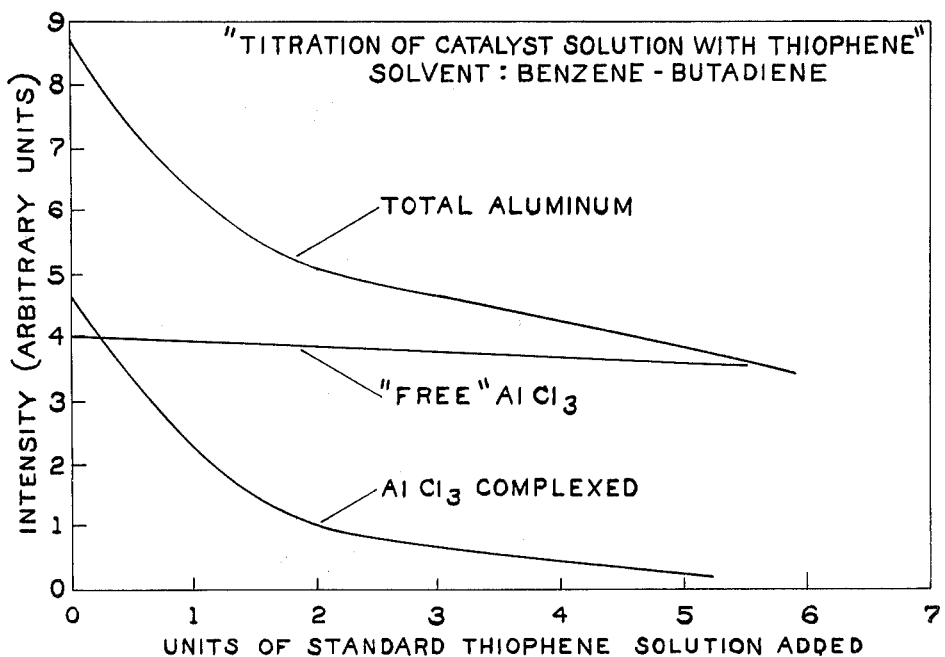

When a fused melt of $CoCl_2$ and $AlCl_3$ is dissolved in benzene and the Nuclear Magnetic Resonance (NMR) spectra of the solution is observed while titrating with thiophene, the high field $Al^{27}$ resonance gradually disappears. FIG. 3 is a plot of data obtained in this manner, resonance intensity being plotted as ordinates and units of a standard thiophene solution ($3.4 \times 10^{-3}$ mole/liter of benzene) as abscissal. Note that the free $Al^{27}$ low field resonance is unchanged until the complexed $Al^{27}$ is nearly completely reacted with thiophene. These observations clearly indicate that the active species is a three-component compound or complex of (1) the divalent transition metal, (2) aluminum halide, and (3) thiophene. Thiophene has strong reactivity with the coordination compound, showing a reactivity 10 times that of butadiene, for example. Aromatic hydrocarbons, particularly alkylated benzenes such as xylene or toluene also associate with the coordination compound. Alkyl amines are believed to do likewise.

Figure 4:
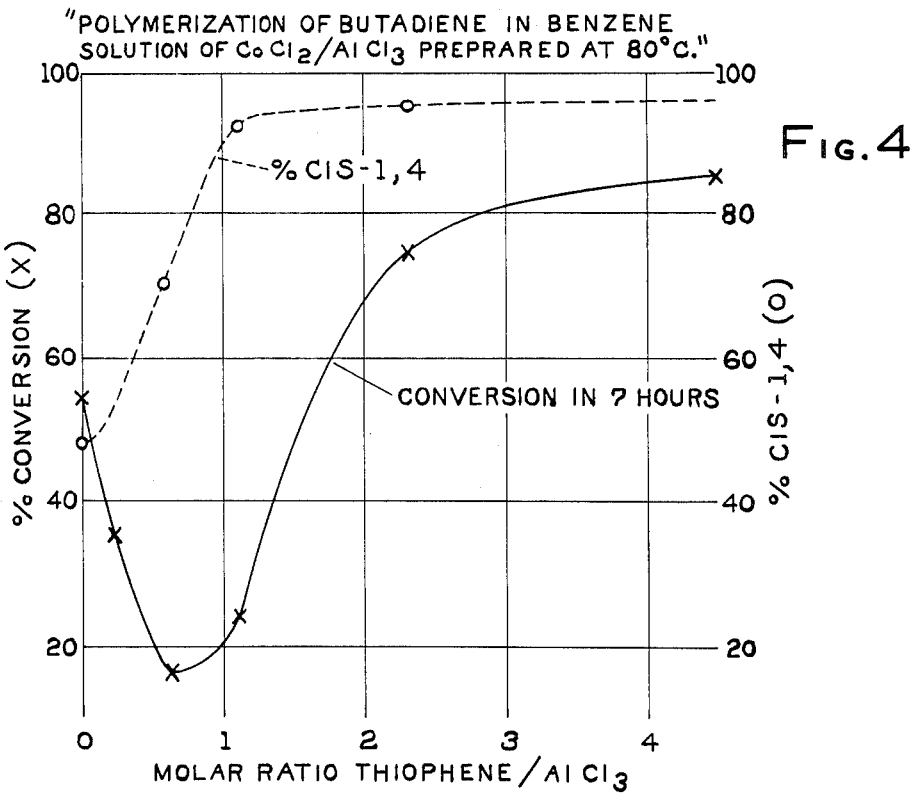

FIG. 4 of the drawings is a composite plot of data obtained in the polymerization of butadiene with the same catalyst prepared by heating a mixture of granular, anhydrous $CoCl_2$ and granular anhydrous $AlCl_3$ in benzene at 80° C. After about 16 hours a green supernatant solution results. The latter is drawn off and added to benzene, then thiophene and finally butadiene are added to effect polymerization. The reaction is terminated in each case at 7 hours, irrespective of the conversion reached. FIG. 4 shows the cis-1,4 content of the resulting polybutadienes plotted as abscissal, upper curve, against the thiophene: aluminum molar ratio (plotted as ordinates). The lower curve is a plot of percent conversion in 7 hours against the polybutadiene from about 50% to about 70% and tion of as little as 0.5 mole of thiophene per mole of aluminum in the catalyst increases the cis-1,4 content of the polybutadiene from about 50% to about 70% and phenylation of the polymer is reduced. At the 1:1 thiophene:aluminum ratio the polymer has a structure in which over 90% of the butadiene units are joined cis-1,4. At ratios of 1:1 to 4:1 the cis-1,4 content of the polymer is above 95%. It is preferred, therefore, to utilize thiophene:aluminum ratios of 1:1 to 6:1 or higher. At ratios above 1:1 phenylation of the polymer is not detected.

Note also that as the thiophene:aluminum ratio is increased the conversion first drops sharply and then increases again quite rapidly. This indicates that one of two competing polymerization mechanisms is being suppressed.

Likewise, vinyl thiophene and other simple alkylated derivatives of thiophene have a similar effect.

Addition to the solution of the coordination compound, preferably in an aliphatic hydrocarbon of 0.5 to 4, more preferably 1 to 2 moles of an alkyl amine per mole of aluminum improves the cis-1,4 content of the polymer. Illustrative amines that may be utilized include triethyl amine, tri-n-butyl amine, trihexyl amine, tri-2-ethylhexyl amine, tri-decyl amine, and others. The higher trialkyl amines containing 4 or more carbon atoms per alkyl group are preferred. The amines also have the effect of solubilizing the catalyst. For example, the normally hydrocarbon-insoluble "oils" are more soluble after addition of an amine.

The "oil" forms of the three-component catalysts have much less Friedel-Crafts activity than the corresponding solution form of coordination compound. The formation of the oil is facilitated and its Friedel-Crafts activity further reduced when the oil is prepared in the presence of an auxiliary proton-acceptor material such as finely-divided aluminum, finely-divided magnesium, and others. In the presence of the latter the "oil" forms much more quickly and separates more cleanly from the hydrocarbon solvent. The finely-divided metal may take up the proton liberated when the aromatic hydrocarbon reacts with or associates with the coordination compound, the proton being neutralized and liberated as hydrogen or as hydrogen halide which in turn reacts with the metal. In this way the reaction between the coordination compound and the aromatic hydrocarbon is driven towards completion. Thiophene is known to have the ability to tie up the proton in an unavailable form. Amines are somewhat similar since they have pronounced reactivity with hydrohalogen acids.

Longer "cooking" of the "oil" in the presence of an aromatic hydrocarbon reduces the Friedel-Crafts activity still further, perhaps by reason of a higher degree of arylation of the coordination compound. Such "oils" produce polybutadienes having 97–98% or more of the cis-1,4 structure.

The third component of the catalyst solution, a proton accepting material or coordinating or complexing material selected from the class consisting of thiophene, vinyl thiophene, aromatic hydrocarbons, and alkyl amines, preferably is added to the two-component coordination compound just before the monomer is added to the polymerization medium. The reason for this is that the three-component catalyst sometimes is not stable in solution in the absence of a polymerizable monomer. For example, if thiophene is added to a solution prepared from a fused melt of 1 mole of $CoCl_2$ and 2 moles of $AlCl_3$, and the resulting catalyst solution allowed to stand, a gummy dark-colored precipitate settles out. Such precipitate appears to be a thiophene:catalyst condensate or polymer. The latter has reduced catalytic activity and is not in a form easily handled in polymerization.

Likewise, the "oil" form of catalyst is apt to freeze, solidify or crystallize in an unpredictable manner. For these reasons, the preferred catalyst preparation is to prepare the coordination compound by solution techniques wherein the anhydrous divalent transition metal compound and the anhydrous aluminum halide are combined in an inert (dry, oxygen-free) hydrocarbon diluent medium containing at least 5 to 10%/wt. of an aromatic hydrocarbon, preferably an aromatic hydrocarbon boiling below 100° C., most preferably benzene, and the mixture agitated at a temperature in the range of 50 to 90° C. to effect solution of the ingredients. There results a solution of two-component coordination compound to which thiophene or an amine is added before admixture with monomer.

THE POLYMERIZATION PROCESS

The three-component catalyst solution of this invention is utilized in polymerization by combining the catalyst solution and monomer under an inert (dry, oxygen-free) atmosphere such as under a high vacuum or under an atmosphere of nitrogen, argon, helium or hydrocarbon vapors. The polymerization reaction proceeds best when the monomer is diluted with a total of from 0.5 to 20 volumes of an inert hydrocarbon solvent or diluent (per volume of monomer) such as any of the liquid aliphatic, aromatic or cycloaliphatic hydrocarbons, preferably those boiling below 100° C. Benzene, xylene, and toluene are preferred diluent media and also mixtures of these with one or more other hydrocarbons such as butane, butene-1, butene-2, pentane, hexane, heptane, cyclohexane, vinylcyclohexene-1, and the like. Preferred diluent media also are butene-1, butene-2 and commercially-available mixtures of these containing just sufficient of a liquid aromatic hydrocarbon boiling below about 100° C. to insure solubility of the polymer in the solvent: diluent media. For the latter purpose 5 to 40%/wt. of the aromatic hydrocarbon is usually sufficient. Where the polymer precipitates there is increased opportunity for gel formation and deposition of solid polymer on equipment surfaces.

The proportion of catalyst utilized in polymerization may vary quite widely depending on the results desired, on the purity of diluent and monomer, on the molecular weight desired in the product and on the polymerization temperature. The less pure monomers and diluents, require more catalyst. As the temperature is decreased, increased catalyst proportions need be utilized. Likewise, increasing catalyst proportions reduce molecular weight of the polymer, although decreasing the reaction temperature will at least partially offset the decreased molecular weight induced by increased catalyst. Within these general considerations, the proportion of catalyst, expressed as percent/wt. based on the weight of monomers, may vary from as little as about 0.01% to about 3%/wt., with from about 0.05 to 1.5% covering the technically important range. Expressed another way, at least about 0.0001 mM. of combined cobalt is usually required, more preferably at least about 0.0005 mM. In some cases, where one is operating in a solvent or diluent in which the catalyst is not appreciably soluble, proportions larger than these may be required.

The polymerization can be carried out in a batch-wise or continuous manner, with or without intermittent or continuous addition of solvent, monomer, and catalyst. The pressure obtained during polymerization is not critical since sub-atmospheric, atmospheric or super-atmospheric pressures may be utilized. Autogenous pressure due to the presence of the solvents and monomer or monomers is preferred.

The polymerization reaction is exothermic and requires cooling to control the reaction temperature in the preferred range below 75° C., most preferably in the range of −30° to 60° C. Cooling may be effected by conduction or by refluxing of solvent, diluent and/or monomer.

The polymerization reaction preferably is carried to substantial completion (i.e. at least about 90% of monomer polymerized) although the reaction may be terminated earlier and the unreacted monomer recovered for recycle. The reaction is terminated by cooling the reaction mixture and "killing" or destroying the catalyst. The latter is effected by adding water, alcohol, acetone, acetic acid, ethers, or any other active hydrogen compound capable of reacting with the catalyst. Until the catalyst is destroyed the reaction mixture must be carefully protected from the atmosphere in order to inhibit gelation and other forms of polymer degradation.

It is also preferred to add rubber antioxidant to the reaction mixture simultaneously with or subsequent to the catalyst destruction and before the polymer can come in contact with oxygen. The reaction mixture may then be treated with water, alcohol or acetone to extract the catalyst residues. Two or three washes with water, which may contain a surface-active agent, are sufficient to reduce the ash content of the polymer to 0.1%/wt. or less. At this point, there remains a polymer solution or slurry in the hydrocarbon diluent.

Simultaneous with or subsequent to the catalyst extraction the reaction mixture is treated to remove the solvent. The latter is best done in the presence of sufficient water to form crumbs of the polymer. In this step, surface-active agents assist crumb formation. Following removal of the solvent the solid rubber can be washed again, more antioxidant added if desired and the polymer then dried. Alternatively, solvent removal can be effected in an organic medium such as an alcohol or acetone whereby the polymer is obtained free of water and easily dried by squeezing and/or solvent drying.

MONOMERS

The catalysts and process of this invention are specific to the polymerization of butadiene-1,3 and its homologs such as isoprene, piperylene, 2,3-dimethyl butadiene, 2-ethyl butadiene-1,3, 2-phenyl butadiene-1,3, 2-isopropyl butadiene-1,3, 2-neopentyl butadiene-1,3, pentadiene-1,3, and many others. Mixtures of one or more of these and other butadiene-1,3 hydrocarbons can be employed. Monoolefins are not polymerized by these catalysts.

Preferred monomers are butadiene and its 2-substituted derivatives containing not more than about 6 carbon atoms such as isoprene and 2-ethyl-butadiene-1,3. Butadiene is most preferred.

The polymers produced by the process described have great commercial value because of the unusual combination of properties. As a class these polymers have higher tensile strengths, higher moduli and better elasticity at lower carbon black loadings than the corresponding heterogenous polymer. In certain properties they are unmatched by previously known natural and synthetic rubbers. For example, polybutadienes having a cis-1,4 content of 93–98% or higher are low hysteresis rubbers, being almost as good in this respect as natural (Hevea) rubber. These same high cis-1,4 polybutadienes have extraordinary abrasion resistance when utilized in tire treads, being from 50 to 500% or more better than the best of natural rubber in this regard. Very high cis-1,4 polyisoprenes equal or excel natural Hevea in nearly every property and in addition have high "tack" in tire carcass compounds, very materially speeding tire building operations and producing tires markedly superior in resistance to failure by ply separation. These two synthetic high cis-1,4 homopolymers of butadiene-1,3 hydrocarbons are fully compatible one with the other, or with natural rubber, and are usable in such blends in building superior heavy duty tires.

The invention will now be more fully described with reference to several specific examples intended as being illustrative only.

Example 1

In this example, cobaltous dichloride hexahydrate (57.5 grams, 0.225 mole) is dehydrated in a resin kettle by heating overnight at 140°–150° C. To the dried, characteristically blue residue ($CoCl_2$) there is added about 0.25 gram mole of anhydrous aluminum trichloride, a pinch of powdered aluminum metal and about 1.5 liters of dry, flash-distilled xylene. Heat is then applied and about ⅓ of the xylene is distilled off. During the distillation, the boiling mixture gradually darkens and an oily bottom layer forms.

A polymerization vessel is readied by long drying in a vacuum oven at 130°–150° C. and then allowed to cool while passing thereinto a current of dry, oxygen-free nitrogen. To this dry, nitrogen-flushed vessel there is added (while continuing to pass in nitrogen) 88 grams of dry benzene and 8 grams of highly purified butadiene-1,3 monomer. The vessel is then sealed and pressured, through a puncture-sealing cap, with 20 lbs./sq. in. of dry nitrogen. 1 ml. of the oily catalyst material prepared as above is then introduced by means of a calibrated hypodermic syringe. The vessel is then rotated end-over-end in a 30° C. water bath overnight. In the morning, about 18 hours later, the contents of the vessel are noted to have thickened noticeably. The vessel is then removed from the bath and 5 ml. of tetrahydrofurane are added to desensitize the mixture against oxygen. Next about 0.5% on the weight of polymer of "Stalite" (heptylated diphenylamine) antioxidant are added plus sufficient of a solution of picolinic acid (in a benzene/diethyl ether/alcohol mixed solvent) to complex the cobalt content of the mixture. These solutions are dispersed thoroughly in the reaction mix before transferring the contents of the vessel into ethyl alcohol to effect simultaneous extraction of the catalyst and precipitation of the polymer. The crumb-like precipitate is washed several times with fresh ethanol and then washmilled into sheets for drying. At the same time a conventional quantity (0.5 to 1.5%/wt. on the rubber) of phenyl-beta-naphthylamine antioxidant is worked into the polymer. The sheets are dried in a vacuum oven at 50° C.

The dried polymer is tough and rubbery in nature. Analysis by the infrared spectrophotometer shows the polymer to contain about 91.3% of the cis-1,4 structure, about 7.4% trans-1,4 and only 1.3% 1,2 structure. Thus, 98.7% of the butadiene units in this polymer are united 1,4. When vulcanized with sulfur and carbon black this polymer develops the characteristically excellent physical properties of high molecular weight, highly linear all cis-1,4 polybutadiene, notable among which is a low hysteresis (intermediate between natural Hevea and SBR rubber) and extraordinary abrasion resistance. The polymer shows evidence of a crystallinity at least as high as that of the natural rubber.

When the above polymerization experiment is repeated using various quantities of the clear supernatant layer (above the "oil") no polymer is obtained. All catalytic activity is in the "oil."

When the procedure of Example 1 is repeated but omitting the cobalt compound, no "oil" separated from the solution, although crystals are observed floating in the xylene. When this solution is utilized in the polymerization of butadiene, an insoluble, powdery, high-melting polymer is obtained. Upon examination, the polymer is found to be heterogenous in structure, probably more or less cyclized in view of its high softening point. The cobalt ingredient when used alone has no catalytic activity.

*Example 2*

The procedure of Example 1 is repeated using toluene in place of the xylene in the preparation of the catalyst "oil." There is obtained a good yield of a rubbery, essentially all 1,4 polybutadiene analyzing as 90.7% cis-1,4; 8.1% trans-1,4; and 1.2% of the 1,2 structure (98.8% 1,4 structure).

*Example 3*

In this experiment, the catalyst formation step is carried out in an open test tube by heating a mixture of cobalt and aluminum salts over an open Bunsen burner. Small amounts of anhydrous cobaltous dichloride and aluminum trichloride are added to a small test tube about half full of dry, commercial xylene. Heat is applied until a dark oil forms and settles out. Hydrochloric acid vapors are detected during the first few moments of heating. A pinch of aluminum powder is then added and the mix stirred for a few minutes. On standing a clear-cut dark oil layer of "oil" is withdrawn by a hypodermic syringe and added to a dry beverage bottle containing 100 ml. of benzene (under $N_2$ flush) followed by 8 grams of liquid "special purity" butadiene (low in water, oxygen, and acetylenic impurities). The bottle is then capped, pressured to about 20 lbs./sq. in. with nitrogen and placed in a 30° C. water bath. After only 40 minutes the contents of the bottle has become moderately viscous. After 18 hours, the contents of the bottle are quite viscous. The viscous condition is worked up as in Example 1, yielding 2.56 grams of a very rubbery, somewhat sticky polymer which analyzes as 94.6% cis-1,4; 0.9% trans-1,4; and 4.5% 1,2. The polymer mills quite easily and readily accepts antioxidants and other compounding ingredients. Upon vulcanization, the polymer is converted to a strong, highly-elastic vulcanizate. The supernatant solvent layer obtained in the catalyst preparation fails to polymerize butadiene-1,3.

*Example 4*

In this example, 14 grams of anhydrous aluminum trichloride (0.5 mole+5% excess over cobalt), 5.9 grams of finely-divided cobalt metal, and 250 ml. of a commercial quality xylene which had been distilled from metallic sodium are combined in a flask which is then heated overnight to reflux the xylene. In the morning a dark homogeneous solution had formed. Upon withdrawing a sample from the top of the flask and adding water to it a strong blue color developed indicating the presence of dissolved cobalt. A dry, nitrogen flushed beverage bottle is charged with 88 grams of dry benzene, 8 grams of "special purity" butadiene-1,3 and 1.5 ml. of the catalytic solution prepared as above is injected thereto. In 16 hours at 30° C., the contents of the sealed bottle have thickened considerably. On working up as in Example 1, about 4 grams of a rubbery polymer are obtained. On infrared analysis this polymer is found to contain 77.7% cis-1,4 structure, 20.1% trans-1,4 and only 2.2% 1,2. Thus a polymer of 97.8% 1,4 structure has been obtained using cobalt metal as a cobalt source. When thiophene is added to the above catalyst just prior to butadiene addition, the polymer contains over 90% cis-1,4 structure.

*Example 5*

In this example approximately equimolar quantities of anhydrous aluminum trichloride and cobalt stearate are combined with a pinch of aluminum metal powder and an excess of toluene. After about 1 hour of reflux, an "oil" has separated out as a bottom layer. When 1 ml. of this "oil" is tested as a catalyst, in the procedure of the foregoing examples, a tough, rubbery polybutadiene is obtained analyzing as 72.0% cis-1,4 structure, 25.5% trans-1,4 (97.5% 1,4) and 2.5% 1,2 structure. It is noted that this polymer contains 34% of toluene-insoluble gel. Likewise, the addition of 1 ml. of thiophene just prior to butadiene addition increases the cis-1,4 content of the polymer to about 90% and reduces the gel to a low value.

*Example 6*

The previous experiments have utilized the "oil" type of catalyst. It is possible to prepare catalyst solutions directly without "oil" formation. For example, 0.53 gram of anhydrous (reagent grade) aluminum tribromide dissolved in 94.5 ml. of dry, flash-distilled benzene is mixed with granular, anhydrous $CoCl_2$ and allowed to stand until the solution becomes saturated with $CoCl_2$. A 10 ml. portion of the resulting clear, green-colored solution is diluted with dry benzene to 35 ml. to form a solution analyzing as containing 0.018 millimole (mM.) $AlBr_3$/ml. and 0.00049 mM. $CoCl_2$/ml. To this latter solution there are added 0.2 ml. of thiophene and 2.2 grams of butadiene and the resulting mixture sealed under dry nitrogen. The solution is gently agitated for 3½ hours at room temperature. Polymerization, as evidenced by viscosity increase, is noted to begin almost immediately. A yield of 1.69 grams of a tough elastomer is obtained having a structure of 94% cis-1,4, 3.8% trans-1,4 and 2.2% 1,2.

The above-described green-colored solution is progressively diluted with benzene to determine the minimum amounts of catalyst capable of effecting polymerization. The experiments are conducted as above, except for dilution of the catalyst:

| mM. $CoCl_2$/ml. | Time, hrs. | Grams polymer |
| --- | --- | --- |
| 0.00097 | 3½ | 1.58 |
| 0.00024 | 3½ | 1.33 |
| 0.00012 | 20 | 0.72 |
| 0.00005 | 20 | 0.10 |

It is clear that very, very little of the catalyst is required. Even purer, drier solvent and monomer may permit further reduction in catalyst proportion.

*Example 7*

In this example, it is demonstrated that certain auxiliary or co-solvents may have a beneficial effect on the cis-1,4 content of the polymer. A catalyst "oil" is made from cobaltous bromide (prepared by dehydration of cobaltous bromide hexahydrate at 140° C. for 16–18 hours) by combining 33 grams (0.1 mole) of the cobalt bromide, 70 grams of anhydrous $AlCl_3$, and 1.5 liters of dry xylene (distilled from sodium) and refluxing the mixture for several hours. An "oil" separates accompanied by liberation of hydrobromic and hydrochloric acid vapors. A pinch of aluminum powder is added and refluxing is resumed for several additional hours. A clearly-defined "oil" layer is observed at the bottom of the distillation flask. The mixture is refluxed several additional hours to insure completion of the catalyst-forming reaction. A sample of the resulting dark "oil" is set aside under nitrogen for use in the "control" experiment "A" below conducted in a pure benzene solvent medium in a 6 oz. beverage bottle. Other samples of the same catalyst "oil" are utilized in Experiments "B," "C" and "D" in a mixed benzene-butene-1 solvent medium. The materials utilized and results obtained are as follows:

| Experiment No. | A (Control) | B | C | D |
|---|---|---|---|---|
| Catalyst, ml | 0.5 | 0.5 | 1.0 | 0.5 |
| Benzene, grams | | 20 | 20 | 20 |
| Butene-1 | | 150 | 150 | 150 |
| Butadiene | | 30 | 30 | 30 |
| Yield, percent | 75 | 23.3 | 100 | 47 |
| Infrared: | | | | |
| Percent cis-1,4 | 83.5 | 93.5 | 93.6 | 94.5 |
| Percent trans-1,4 | 14.4 | 3.5 | 4.5 | 2.8 |
| Percent 1,2 | 2.1 | 3.0 | 1.9 | 1.7 |

There was no evidence in the infrared traces that the resulting polybutadienes contained butene groups. Polymer "C," above, is a sticky, solid polymer which is found to mill very readily on a rubber mill.

*Example 8*

In this experiment, the use of tri-n-hexyl amine is demonstrated. A mixture of 13.34 grams (0.1 mole) of anhydrous aluminum trichloride; 4.33 grams (0.033 mole) of anhydrous cobaltous dichloride; and a pinch of aluminum metal powder are combined in 250 ml. of dry commercial xylene and the mixture carefully refluxed until the separation of a dark "oil" is noted. Then a 20 ml. of the amine (amine:Al molar ratio of 1.5) is added and the refluxing resumed. After a short time, the separate oil layer disappears and a dark, homogeneous-appearing solution forms. The latter is utilized in the polymerization of butadiene-1,3 by agitating the following mixtures of materials in sealed, nitrogen-filled bottles for about 16 hours at 50° C.:

| | Experiment A | Experiment B |
|---|---|---|
| Benzene, grams | 88 | 20 |
| Catalyst solution, ml | 3 | 3 |
| Butene-1, grams | | 150 |
| Butadiene-1,3,[1] grams | 8 | 30 |
| Infrared analysis: | | |
| Cis-1,4, percent | 92.4 | 96.5 |
| Trans-1,4 | 8.7 | 2.3 |
| 1,2 | 0.9 | 1.2 |
| Yield, percent | 25 | 33 |

[1] Phillips Petroleum Co., "Special Grade," flash distilled.

*Example 9*

In this experiment, 3.17 (0.033 mole) grams of cobaltous hydroxide and 14.25 grams (0.056 mole) of perfluorobutyric acid (hepta-fluoro butyric acid) are combined in 250 ml. of freshly distilled xylene and the mixture is refluxed for about a half hour. A dark, blue-purple colored mixture results. Then a slow distillation of xylene is commenced to remove water. The distillate is quite acid at first but the acidity tapers off rapidly to a low value. An equal volume of dry xylene is added and the water removal operation repeated with a still head temperature of 130° C. At this point, 13.34 grams (0.1 mole) of anhydrous aluminum trichloride are added and the mixture refluxed for an additional 6 hours. The mixture clarifies (i.e. no solid) to form two very dark liquid phases which are very difficult to distinguish from each other visually. The oily appearing bottom layer is utilized in the polymerization of butadiene-1,3 by a procedure similar to the preceding examples, utilizing the following materials:

| | |
|---|---|
| Benzene, grams | 16 |
| Catalyst solution,[1] ml. | 5 |
| Butene-1, grams | 120 |
| Butadiene-1,3 grams | 27 |

[1] About 6 millimoles of aluminum, about 2 millimoles of cobalt.

The nitrogen-filled bottle is tumbled end-over-end for 16 hours at 5° C. Even 10 minutes after addition of the butadiene, there is foaming and other evidence of vigorous reaction. The mixture rapidly becomes viscous. The final yield is 100% of a rubbery, tough polybutadiene having excellent tack. Infrared analysis shows the polymer to contain 90.7% cis-1,4; 8.3% trans-1,4; 1% 1,2, and no evidence of butene polymerization. This polymer mills very reeadily on a two-roll rubber mill forming an excellent rolling bank and readily accepting compounding ingredients. Upon vulcanization, excellent physical properties are attained.

*Example 10*

In this experiment isoprene is polymerized using a catalyst prepared by combining 27 grams (0.2 mole) of anhydrous $AlCl_3$, 1.3 grams (0.05 mole) of fine aluminum powder, 0.57 gram (0.066 mole) of anhydrous $CoCl_2$, and 250 ml. of xylene in a nitrogen-flushed flask. After stirring for several hours a dark "oil" forms and settles out. This "oil" is used in polymerization as follows:

| Material: | Parts |
|---|---|
| Benzene | grams__ 40 |
| Thiophene | ml.__ 0.5 |
| Catalyst "oil" (above) | ml.__ 2 |
| Isoprene | grams__ 12 |
| Butene-1 | do____ 130 |

The polymerization is carried out at 5° C. in bottles which are charged under nitrogen. There is obtained a good yield of a very rubbery high molecular weight polymer having no gel and a DSV (dilute solution viscosity) of 3.87. Infrared analysis shows the polymer to have a structure in which trans-1,4 structure can not be detected and the ratio of the optical densities for 3,4 to 1,4 polymer is 3.30. This means that the polymer very strongly predominates (i.e. 60% or more) in cis-1,4 structure (note: The 3,4 structure is much more strongly absorbent than is the cis-1,4 structure). Another experiment in which an increased proportion of thiophene is utilized produces a polyisoprene having a 3,4/1,4 ratio of 2.5 (estimated cis-1,4 content 80–85%).

In the above experiment thiophene is added to inhibit Friedel-Crafts polymerization, isoprene being much more susceptible than is butadiene to this type of polymerization. Without it, a powdery, resinous, insoluble and very high melting polymer is obtained.

*Example 11*

To further demonstrate the Friedel-Crafts inhibiting effects of thiophene, a catalyst is prepared by fusing, under nitrogen in a sealed tube, 4 grams (0.03 M) of anhydrous $AlCl_3$; 3.90 grams (0.03 M) of anhydrous $CoCl_2$; and 0.107 gram (0.004 M) of aluminum powder. The sealed tubes are wrapped in glass cloth and mounted in a rocking autoclave heated at 200° C. After several hours, the cooled material (blue color) in the tube looks like a uniform solution of the $CoCl_2$ in the $AlCl_3$. A quarter of a gram of the fused solid is removed from the tube and added to a nitrogen-flushed beverage bottle containing 16 grams of benzene, 52 grams of butene-1, 0.2 ml. of thiophene and 12 grams of butadiene. The sealed, nitrogen-filled bottle is tumbled in a 5° C. water bath for one hour. After working up in the manner shown in the preceding examples, a quantitative yield of a rubbery polybutadiene is obtained. Its structure is 97.7% cis-1,4, 1.7% trans-1,4 and only 0.6% 1,2. Very definitely, the presence of the thiophene raises the cis-1,4-content at the expense of the 1,2 structural content of the butadiene polymer.

*Example 12*

In this example, another homogeneous ("oil"-free) catalyst is prepared from an organic salt of cobalt. In the preparation of the latter, 23.79 grams, (0.2 M) of cobaltous carbonate ($CoCO_3$) is added slowly with stirring to a mixture of 124 grams (0.4 M) of "Sulfonic 100" (made by Stepan Chemical Co., Chicago, Ill. and said to be the sulfonate of a polypropylene/benzene condensate), a few ml. of methanol and a few ml. of water. The mixture is stirred for a short while and then heated to boiling until no further effervescence of $CO_2$ occurs. Then about 1.5 liters of commercial xylene are added and the mixture azeotropically distilled to remove alcohol and water. In the drying process, the total volume of solution is reduced to less than 1 liter.

A five hundred ml. aliquot of the cobalt-sulfonic acid salt solution is transferred to a nitrogen-flushed dropping funnel attached to a 1 liter 3-neck flask containing a mixture of 200 ml. of xylene, a pinch of aluminum powder and 13.34 grams (0.1 mole) of anhydrous $AlCl_3$. The stirrer is started and 25 ml. portions of the cobalt solution are added while the xylene in the flask is at refluxing temperature. After 50 ml. of the cobalt solution had been added, all the $AlCl_3$ appears to have dissolved, the solution at this point being dark and homogeneous. On cooling, however, crystals settle out of the solution so additional cobalt solution is added in 25 ml. increments. Crystal formation is observed after each 25 ml. addition of cobalt solution until a total of 200 ml. of cobalt solution has been added. The solution then is homogeneous, though dark in color. The resulting solution is used in polymerization as noted below:

| Material | A | B | C |
|---|---|---|---|
| Benzene, ml | 440 | 40 | 40 |
| Catalyst sol., above, ml | 10 | 10 | 10 |
| Thiophene, ml | | | 0.3 |
| Butene-1, grams | | 130 | 130 |
| Butadiene, grams | 30 | 30 | 30 |

An immediate, vigorous reaction in experiment "B" is noted, indicating the catalyst is reacting with the butene-1 diluent. Experiments A and C, however, react normally with the following results:

| | A | C |
|---|---|---|
| Yield, percent/wt | 23.3 | 100 |
| Infrared analysis: | | |
| Cis-1,4, percent | 97.0 | 96.6 |
| Trans-1,4, percent | 2.2 | 2.6 |
| 1,2, percent | 0.8 | 0.8 |
| Gel content, percent/wt | 5 | 0 |
| DSV | 1.839 | 2.252 |

The polymer in experiment "C," above, is a particularly good rubber. Its 212/10 minute Mooney viscosity is 60 ml. Such rubber mills very easily and has very good hysteresis and extraordinary abrasion resistance properties when vulcanized in standard tire tread and carcass recipes.

*Example 13*

An "oily" type catalyst, prepared by refluxing 27.9 grams (0.2 M) of anhydrous $AlCl_3$, 8.5 grams (0.066 M) of anhydrous $CoCl_2$, and 1.35 grams (0.05 M) of fine aluminum powder in 250 ml. of xylene, is utilized to polymerize 2,3-dimethyl-butadiene-1,3. The polymerization is carried out at 5° C. utilizing the procedure of the preceding examples and the following materials:

Material:
   Benzene _____grams__ 16
   Thiophene _____ml__ 0.2
   Catalyst sol. (above) _____ml__ 0.8
   Butene-1 _____grams__ 52
   2,3-dimethyl-butadiene-1,3, _____do____ 12

After about 16 hours there is obtained, after work-up and drying a good yield of a powdery polymer which becomes rubbery when warmed and gives strong evidence of crystallinity at room temperature. The polymer is soluble in hydrocarbon solvents. Although infrared analysis of this polymer is neither qualitative nor quantitative due to lack of model compounds and polymers for calibration purposes, the polymer gives evidence of a highly ordered structure. Because of its rubbery nature when warmed, its structure is believed linear and highly 1,4 in arrangement.

*Example 14*

In this experiment a catalyst is prepared from anhydrous $NiCl_2$ and anhydrous $AlCl_3$. The coordination compound is prepared by sealing 6.9 grams of $AlCl_3$, 3.2 grams of $NiCl_2$ and 0.1 gram of aluminum powder in a Pyrex tube and heating the tube and its contents at 275–300° C. in a rocking autoclave for 15 hours. The contents of the tube appear to be a homogeneous melt containing nickel and aluminum in about a 1:2 molar ratio.

In a polymerization of butadiene carried out in an oven-dried glass beverage bottle, 1.3 grams of the solid catalyst is dissolved in 88 grams of dry benzene and then 8 grams of "special purity" butadiene (dried with 4 A molecular sieves) added. In 17 hours at 30° C., the contents of the sealed bottle (nitrogen pressured) thicken appreciably. Upon working up as in Example 1, 4.3 grams of polybutadiene are obtained having a structure in which 70% of the butadiene units are united cis-1,4, 27.5% trans-1,4 and 2.5% 1,2 for a total 1,4 content of 97.5%. The infrared trace shows that some phenylation had occurred.

In a repeat experiment 0.2 ml. of thiophene is added. There is obtained 4.4 grams of a polybutadiene in which 75% of the butadiene-1,3 units are united cis-1,4, 23.5% trans-1,4 and 1.5% 1,2. The infrared trace indicates a pronounced decrease in phenylation of the polymer.

In still another experiment when 6.9 grams of $AlCl_3$, 3.5 grams of $NiCl_2$, 0.8 gram of aluminum powder, and 150 ml. of dry xylene are refluxed under nitrogen, an "oil" layer formed. The oil (1 ml.), 88 grams of benzene, 0.2 ml. of thiophene and 8 grams of butadiene are combined under dry nitrogen and agitated 22 hours at 30° C. A very viscous liquid all-1,4 polybutadiene is obtained containing only 2% 1,2 structure. The product is useful in blends with natural rubber and in blends with SBR.

*Example 15*

In this example, a chromium/aluminum catalyst is produced by fusing 4.2 grams of $CrCl_2$ and 9.1 grams of $AlCl_3$ in a sealed glass tube at 300° C. for 24 hours. The resulting coordination compound is made up in a catalyst solution by dissolving 0.49 gram of the solid melt in 87 grams of dry benzene and then adding 1 ml. of thiophene. To the resulting solution 3.9 grams of dry butadiene are added and the bottle sealed under nitrogen. In 24 hours at 30° C. 0.73 gram of a soft polymer is obtained having a structure in which 84% of the butadiene units are joined cis-1,4, 14% trans-1,4 and 2.1% 1,2.

In repeat experiments with 0.25 ml. and 0.5 ml. of thiophene the cis-1,4 contents are 78% and 82%, respectively.

Example 16

In a similar fashion, 4.4 grams of $MnCl_2$ and 9.3 grams of $AlCl_3$ (Mn:Al molar ratio 1:2) are fused for 24 hours at 300° C. The resulting coordination compound is made up as a catalyst solution by dissolving 0.49 of the fused melt in 90.2 grams of benzene and then adding 0.25 ml. of thiophene. To the resulting solution there are added 4.1 grams of butadiene and the mixture sealed in a beverage bottle under nitrogen. In 18 hours at 30° C., there is obtained 0.7 gram of a tacky polybutadiene having a structure in which 88% of the butadiene units are joined cis-1,4, 9% trans-1,4 and 3% 1,2. Upon the use of increased thiophene levels, the results are as follows:

| Thiophene, ml. | Structure, percent | | |
|---|---|---|---|
| | Cis | Trans | 1, 2 |
| 0.25 | 88 | 9 | 3 |
| 0.50 | 90 | 7 | 3 |
| 1.0 | 92 | 5 | 3 |

Example 17

In this example, 4.4 grams of $FeCl_2$ and 9.6 grams of $AlCl_3$ (Fe/Al molar ratio 1:2) are fused at 300° C. for 24 hours; 0.49 gram of the resulting melt dissolved in 91.7 grams of benzene and 1 ml. of thiophene added. To the resulting catalyst solution 4.1 grams of butadiene are added and the resulting mixture agitated (under nitrogen) for about 40 hours at 30° C. A small amount of a sticky, rubbery polybutadiene is obtained having a structure in which 77% of the butadiene units are joined cis-1,4, 19% trans-1,4 and 4% 1,2. Higher thiophene concentrations result in higher cis-1,4 polymers.

Example 18

In this experiment, 1 mole of anhydrous platinum dichloride and 2 moles of anhydrous $AlCl_3$ are fused for 24 hours at 300–500° C. in a sealed glass tube. The resulting coordination compound is made up into a catalyst solution by dissolving 1 gram of the fused melt in 88 grams of dry butadiene and then adding 1 ml. of thiophene. To the resulting solution there are added 8 grams of butadiene and the resulting mixture sealed under nitrogen and agitated for about 48 hours at 30° C. After work-up as in Example 1, 3 grams of a solid polybutadiene are obtained having a structure in which 88.4% of the butadiene units are joined cis-1,4, 9.5% trans-1,4 and 2.1% as 1,2.

Example 19

A catalyst is prepared by a one-step procedure wherein 0.76 gram of anhydrous aluminum triiodide, 0.27 gram of anhydrous $CoCl_2$, and 98 grams of dry benzene are heated with agitation at 50° C. for 2½ hours. The mixture is allowed to cool and settle producing a clear, orange-brown supernatant layer. The latter is a 3-component catalyst solution utilized directly in the polymerization of butadiene by combining under nitrogen in a nitrogen-flushed beverage bottle 35 ml. of the supernatant solution, 0.2 ml. of thiophene and 2.2 grams of "special purity" butadiene. In 17 hours at 30° C. a sticky, soft polybutadiene is obtained in which 77% of the butadiene units are joined cis-1,4, 7% trans-1,4 and 16% 1,2. When the thiophene level is increased to 0.5 and then to 1.0 ml., polybutadienes of over 90% cis-1,4 structure are obtained.

Example 20

In this example, $CoF_2$ is utilized in the production of an excellent catalyst. The anhydrous $CoF_2$ is prepared by decomposing a $CoF_2/NH_4F$ adduct at 300–400° C. A mixture of the anhydrous $CoF_2$ and an excess (i.e. more than 2 moles/mole $CoF_2$) of anhydrous $AlCl_3$ are combined in benzene and heated at 50° C. overnight. Next day a green-colored solution has resulted which analyzes as containing 0.0203 mM. Co/Ml. The clear supernatant has an analysis indicated approximately by $CoAl_{3.5}Cl_{11}$ with no trace of dissolved fluorine. This indicates that the solution contains excess dissolved $AlCl_3$ sufficient to form an appreciable quantity of $CoAl_2Cl_8$. The clear supernatant material is utilized in polymerizing butadiene by combining 80 ml. of the catalyst solution with 0.5 ml. of thiophene and 114 grams of butene-1. To the resulting clear solution, there is added immediately 30 grams of butadiene and the bottle sealed. After 16 hours at 30° C. a 100% yield of a solid polybutadiene having a D.S.V. of 1.762, 0.56% gel (the gel has a swelling index of 121 indicating a highly swollen structure) and a structure in which 98% of the butadiene units are joined cis-1,4, 1.2% trans-1,4 and 0.8% 1,2 structure.

We claim:

1. A process for polymerizing a monomeric butadiene-1,3 hydrocarbon comprising combining said monomeric butadiene-1,3 hydrocarbon with a reaction medium containing (1) a coordination compound in which one atom of a divalent transition metal selected from the group consisting of cobalt, nickel, iron, manganese, chromium, palladium and platinum is coordinated with two atoms of aluminum through bridges of halogen atoms having an atomic weight greater than 19, and (2) at least about 0.5 mole per mole of aluminum in solution of a substance selected from the class consisting of thiophene, vinyl thiophene, alkylated aromatic hydrocarbons and alkyl amines, and in reaction mixtures where component (2) is an alkylated hydrocarbon, the said hydrocarbon having been heated during formation of component (1) with a metal selected from the group consisting of aluminum and magnesium until a separate catalytically active liquid oil phase has been obtained, polymerizing said monomeric butadiene-1,3 hydrocarbon in the resulting reaction mixture at a temperature below about 75° C., and separating from said medium the resulting polymer having a structure in which at least 90% of the butadiene-1,3 hydrocarbon monomer units are joined 1,4 and strongly predominating in cis-1,4 units, and said reaction medium being free of added materials in which a hydrcarbon group is joined directly to a metal atom through an ordinary metal-to-carbon bond.

2. A process as defined in claim 1 wherein said divalent transition metal is nickel.

3. A process as defined in claim 1 wherein said divalent transition metal is chromium.

4. A process as defined in claim 1 wherein said divalent transition metal is iron.

5. A process as defined in claim 1 wherein said divalent transition metal is manganese.

6. A process for polymerizing monomeric butadiene-1,3 comprising combining said monomeric butadiene-1,3 with a reaction medium containing (1) an inert hydrocarbon diluent, (2) a coordination compound dissolved in said diluent and in which one atom of a divalent transition metal selected from the group consisting of cobalt, nickel, iron, manganese, chromium, palladium, and platinum is coordinated with two atoms of aluminum through bridges of halogen atoms having an atomic weight greater than 19, and (3) at least 0.5 mole per mole of aluminum in solution of a substance selected from the class consisting of thiophene, vinyl thiophene, alkylated aromatic hydrocarbons and alkyl amines, and in reaction mediums where component (3) is an alkylated aromatic hydrocarbon, said hydrocarbon having been heated during formation of component (2) with a metal selected from the group consisting of aluminum and magnesium until a separate catalytically active liquid oil phase has been obtained, polymerizing said monomeric butadiene-1,3 in said reaction medium at a temperature in the range from about −30° to about 60° C., and separating from said medium the resulting polymer having a structure in which at least 90% of the butadiene-1,3 units are joined 1,4 and strongly predominating in cis-1,4 structure, and said reaction medium being free of added materials in which a hydrocarbon group is joined directly to a metal atom through an ordinary metal-to-carbon bond.

7. A method for polymerizing monomeric butadiene-1,3 comprising combining said monomeric butadiene-1,3 with a reaction medium comprising (1) an inert hydrocarbon diluent containing at least 5%/wt. of an aromatic hydrocarbon boiling below 100° C., (2) dissolved in said hydrocarbon diluent a coordination compound in which one atom of divalent cobalt is coordinated with two aluminum atoms through bridges of halogen atoms having an atomic weight in the range of 35 to 80 so as to exhibit substantially square planar symmetry about the cobalt nucleus, and (3) from about 3 to about 6 moles of thiophene per mole of aluminum in said reaction medium, polymerizing said monomeric butadiene-1,3 in said reaction medium at a temperature in the range of from about —30° to about 60° C., and separating from said reaction medium a polybutadiene in which at least 95% of the butadiene 1,3 monomer units are joined cis-1,4.

8. A method as defined in claim 7 in which said coordination compound is the fused product from the fusion of a mixture of about one mole of an anhydrous cobaltous dihalide with about two moles of an anhydrous aluminum trihalide.

9. A composition comprising a solution in an inert hydrocarbon diluent of (1) a coordination compound having a unit in which one atom of divalent cobalt is coordinated with two atoms of aluminum through bridges of halogen atoms having an atomic weight greater than 19 and (2) from about 0.5 to 6 moles of thiophene per mole of said aluminum, said solution being free of materials in which a hydrocarbon group is attached to a metal atom by an ordinary metal-to-carbon bond.

10. A method of making a catalyst solution having cis-1,4 directive effect in the polymerization of butadiene-1,3 hydrocarbons comprising combining (1) in an inert hydrocarbon diluent, an anhydrous divalent cobalt compound with (2) an anhydrous aluminum trihalide in which the halogens have an atomic weight above 19, effecting intramolecular combination of substances (1) and (2) to form a coordination compound in which one atom of said divalent cobalt is coordinated with two atoms of aluminum through bridges of halogen atoms having an atomic weight greater than 19, combining the resulting coordination compound with (3) at least about 0.5 mole per mole of aluminum in solution of a complexing agent selected from the class consisting of thiophene, vinyl thiophene, alkylated aromatic hydrocarbons, and alkyl amines, the material combined in producing said solution being free of materials in which a hydrocarbon group is joined directly to a metal atom through a metal-carbon bond, and where the complexing agent is an alkylated aromatic hydrocarbon, heating the mixture in the presence of an auxiliary proton acceptor selected from the group consisting of aluminum and magnesium, and in the presence of components (1) and (2), until a separate catalytically active liquid oil phase is obtained.

11. A method as defined in claim 10 wherein ingredient (3) is an alkylated aromatic hydrocarbon and the said coordination compound is combined therewith in the presence of finely-divided aluminum metal thereby forming a separate catalytically active oil phase which is insoluble in said hydrocarbon diluent.

12. A method of making a catalyst solution having cis-1,4 directive effect in the polymerization of butadiene-1,3 hydrocarbons comprising combining (1) an anhydrous cobaltous dihalide with (2) an anhydrous aluminum trihalide in which the halogens have an atomic weight above 19, about one mole of the dihalide being present for every two moles of said trihalide employed, effecting intramolecular combination of substances (1) and (2) by melting the two together, and dissolving the melted-together material in an inert hydrocarbon diluent containing at least 5%/wt. of an aromatic hydrocarbon boiling below 100° C. to form a coordination compound in which one atom of said cobaltous dihalide is coordinated with two atoms of aluminum through bridges of halogen atoms having an atomic weight greater than 19, combining the resulting coordination compound with thiophene added in a proportion of from about 0.5 to about 6 moles per mole of aluminum in said catalyst solution, the material combined in producing said solution being free of materials in which a hydrocarbon group is joined directly to a metal atom through a metal-carbon bond.

13. A method of making a catalyst solution having cis-1,4 directive effect in the polymerization of butadiene-1,3 hydrocarbons comprising combining (1) in an inert hydrocarbon diluent an anhydrous divalent cobalt compound with (2) an anhydrous aluminum trihalide in which the halogens have an atomic weight above 19, effecting intramolecular combination of substances (1) and (2) to form a coordination compound in which one atom of said divalent cobalt is coordinated with two atoms of aluminum through bridges of halogen atoms having an atomic weight greater than 19, combining the resulting coordination compound with (3) from about 0.5 to about 6 moles of thiophene per mole of aluminum in said catalyst solution, the material combined in producing said solution being free of materials in which a hydrocarbon group is joined directly to a metal atom through a metal-carbon bond.

14. A method as claimed in claim 13 in which the said coordination compound is associated with an alkylated aromatic hydrocarbon as a liquid oil phase by heating a mixture of an anhydrous cobaltous dihalide, an anhydrous aluminum trihalide, aluminum metal, and an alkylated aromatic hydrocarbon boiling below 100° C.

References Cited by the Examiner

UNITED STATES PATENTS

| | | | |
|---|---|---|---|
| 3,049,526 | 8/1962 | D'Alelio | 260—94.3 |
| 3,066,125 | 11/1962 | Porter et al. | 260—94.3 |
| 3,093,625 | 6/1963 | Friederich et al. | 260—94.3 |

FOREIGN PATENTS

| | | |
|---|---|---|
| 579,689 | 12/1959 | Belgium. |
| 874,215 | 8/1953 | Germany. |
| 851,113 | 10/1960 | Great Britain. |

JOSEPH L. SCHOFER, *Primary Examiner.*

MORRIS LIEBMAN, WILLIAM H. SHORT,
*Examiners,*